(12) United States Patent
Hätönen et al.

(10) Patent No.: US 7,461,037 B2
(45) Date of Patent: Dec. 2, 2008

(54) CLUSTERING TECHNIQUE FOR CYCLIC PHENOMENA

(75) Inventors: Kimmo Hätönen, Helsinki (FI); Pekka Kumpulainen, Lempäälä (FI); Pekko Vehviläinen, Tampere (FI)

(73) Assignee: Nokia Siemens Networks Oy, Espoo (FI)

( * ) Notice: Subject to any disclaimer, the term of this patent is extended or adjusted under 35 U.S.C. 154(b) by 353 days.

(21) Appl. No.: 10/748,673

(22) Filed: Dec. 31, 2003

(65) Prior Publication Data

US 2005/0144148 A1 Jun. 30, 2005

(51) Int. Cl.
*G06E 1/00* (2006.01)
*G06E 3/00* (2006.01)
*G06F 15/18* (2006.01)
*G06G 7/00* (2006.01)

(52) U.S. Cl. .......................................... 706/18
(58) Field of Classification Search .................. 706/12, 706/16–20
See application file for complete search history.

(56) References Cited

U.S. PATENT DOCUMENTS

| | | | | |
|---|---|---|---|---|
| 4,821,264 A | * | 4/1989 | Kim | 370/434 |
| 5,148,485 A | * | 9/1992 | Dent | 380/46 |
| 5,694,428 A | * | 12/1997 | Campana, Jr. | 375/260 |
| 5,710,798 A | * | 1/1998 | Campana, Jr. | 375/347 |
| 5,717,725 A | * | 2/1998 | Campana, Jr. | 375/347 |
| 5,742,644 A | * | 4/1998 | Campana, Jr. | 375/316 |
| 5,745,532 A | * | 4/1998 | Campana, Jr. | 375/347 |
| 5,751,773 A | * | 5/1998 | Campana, Jr. | 375/346 |

(Continued)

FOREIGN PATENT DOCUMENTS

EP 1 309 062 A2 5/2003

(Continued)

OTHER PUBLICATIONS

Performance Analysis of the IEEE 802.11e Enhanced Distributed Coordination Function Using Cycle Time Approach Inan, I.; Keceli, F.; Ayanoglu, E.; Global Telecommunications Conference, 2007. Globecom '07. IEEE Nov. 26-30, 2007 pp. 2552-2557 Digital Object Identifier 10.1109/Glocom.2007.485.*

(Continued)

*Primary Examiner*—Michael B Holmes
(74) *Attorney, Agent, or Firm*—Squire, Sanders & Dempsey L.L.P.

(57) ABSTRACT

A data processing system processes data arrays that collectively describe cyclic behavior of at least one variable in several entities in a physical process. Each cycle comprises several time slots. An input routine (2-4) receives multiple data arrays, each data array containing multiple data items, each of which describes a variable of an entity in one time slot. A magnitude-determination routine (2-6) determines a specific magnitude parameter, such as average, volume or peak, for each of the several entities. A scaling routine (2-8) scales the data arrays between entities such that the specific magnitude parameters are suppressed and only their shape is maintained. A training routine (2-10) trains a clustering system with a first plurality of the scaled data arrays, to determine a set of cluster centers. After training, a clustering routine (2-12) applies a second plurality of the scaled data arrays to the trained clustering system.

25 Claims, 5 Drawing Sheets

U.S. PATENT DOCUMENTS

| | | | |
|---|---|---|---|
| 5,764,241 A * | 6/1998 | Elliott et al. | 345/473 |
| 6,198,783 B1 * | 3/2001 | Campana, Jr. | 375/346 |
| 6,272,190 B1 * | 8/2001 | Campana, Jr. | 375/347 |
| 6,473,084 B1 * | 10/2002 | Phillips et al. | 345/440 |
| 6,553,332 B2 | 4/2003 | Leng | |
| 6,606,615 B1 * | 8/2003 | Jennings et al. | 706/45 |
| 6,658,467 B1 * | 12/2003 | Rice et al. | 709/224 |
| 6,701,389 B2 * | 3/2004 | Gorti et al. | 710/29 |
| 6,792,399 B1 * | 9/2004 | Phillips et al. | 705/36 R |
| 6,850,252 B1 * | 2/2005 | Hoffberg | 715/716 |
| 7,051,309 B1 * | 5/2006 | Crosetto | 716/10 |
| 7,072,863 B1 * | 7/2006 | Phillips et al. | 703/2 |
| 7,099,628 B2 * | 8/2006 | Galperin et al. | 455/67.14 |
| 7,149,387 B2 * | 12/2006 | Balakrishnan et al. | 385/37 |
| 7,219,020 B1 * | 5/2007 | Hull et al. | 702/27 |
| 7,223,234 B2 * | 5/2007 | Stupp et al. | 600/300 |
| 7,311,666 B2 * | 12/2007 | Stupp et al. | 600/300 |
| 7,327,795 B2 * | 2/2008 | Oprea | 375/260 |
| 7,327,800 B2 * | 2/2008 | Oprea et al. | 375/267 |
| 7,366,160 B2 * | 4/2008 | Marilly et al. | 370/352 |
| 7,369,491 B1 * | 5/2008 | Beshai et al. | 370/230 |

FOREIGN PATENT DOCUMENTS

| | | |
|---|---|---|
| WO | WO 01/33354 A1 | 5/2001 |
| WO | 03/032123 A2 | 4/2003 |

OTHER PUBLICATIONS

Performance evaluation using measure dependent transitions in Petri nets Tutsch, D.; Holl-Biniasz, R.; Modeling, Analysis, and Simulation of Computer and Telecommunication Systems, 1997. Mascots '97., Proceedings Fifth International Symposium on Jan. 12-15, 1997 pp. 235-240 Digital Object Identifier 10.1109/Mascot.1997.567618.*

A Fourier approach to the study of cyclic behaviour of networks Habibi, D.; Lewis, D.J.H.; Singapore ICCS '94. Conference Proceedings. vol. 1, Nov. 14-18, 1994 pp. 100-103 vol. 1 Digital Object Identifier 10.1109/ICCS.1994.474098.*

Comparison of message aggregation strategies for parallel simulations on a high performance cluster Pham, C.D.; Modeling, Analysis and Simulation of Computer and Telecommunication Systems, 2000. Proceedings. 8th International Symposium on Aug. 29-Sep. 1, 2000 pp. 358-365 Digital Object Identifier 10.1109/Mascot.2000.876559.*

Planned object duplication strategies in dynamic PRR meshes Bradshaw, M.K.; Rosenberg, A.L.; Towsley, D.; Network Protocols, 2003. Proceedings. 11th IEEE International Conference on Nov. 4-7, 2003 pp. 50-60 Digital Object Identifier 10.1109/ICNP.2003.1249756.*

MH-TRACE: multihop time reservation using adaptive control for energy efficiency Tavli, B.; Heinzelman, W.B.; Selected Areas in Communications, IEEE Journal on vol. 22, Issue 5, Jun. 2004 pp. 942-953 Digital Object Identifier 10.1109/JSAC.2004.826932.*

Dynamic reconfiguration in computer clusters with irregular topologies in the presence of multiple node and link failures Avresky, D.; Natchev, N.; Computers, IEEE Transactions on vol. 54, Issue 5, May 2005 pp. 603-615 Digital Object Identifier 10.1109/TC.2005.76.*

Statistical pre-filtering for MIMO-OFDM systems Wing Seng Leon; Ying-Chang Liang; Vehicular Technology Conference, 2005. VTC 2005-Spring. 2005 IEEE 61st vol. 2, May 30-Jun. 1, 2005 pp. 1012-1016 vol. 2 Digital Object Identifier 10.1109/Vetecs.2005.1543459.*

An effective methodology to improve the performance of the up*/down* routing algorithm Sancho, J.C.; Robles, A.; Duato, J.; Parallel and Distributed Systems, IEEE Transactions on vol. 15, Issue 8, Aug. 2004 pp. 740-754 Digital Object Identifier 10.1109/TPDS.2004.28.*

* cited by examiner

| Day (1=Monday) | Cluster | Probability, % |
|---|---|---|
| 1, 2, 3, 4, 7 | 4 | 100 |
| 5 | 1 | 83 |
|  | 4 | 17 |
| 6 | 3 | 100 |

| Day (1=Monday) | Cluster | Probability, % |
|---|---|---|
| 1 | 1 | - |
|  | 2 | - |
|  | 3 | - |
|  | 4 | 100 |
| 2 | 1 | 10 |
|  | 2 | - |
|  | 3 | - |
|  | 4 | 90 |
| 3 | 1 | - |
|  | 2 | - |
|  | 3 | - |
|  | 4 | 100 |
| 4 | 1 | 10 |
|  | 2 | - |
|  | 3 | - |
|  | 4 | 90 |
| 5 | 1 | 70 |
|  | 2 | - |
|  | 3 | - |
|  | 4 | 30 |
| 6 | 1 | - |
|  | 2 | - |
|  | 3 | 100 |
|  | 4 | - |
| 7 | 1 | - |
|  | 2 | - |
|  | 3 | 10 |
|  | 4 | 90 |

CLUSTERING TECHNIQUE FOR CYCLIC PHENOMENA

BACKGROUND OF THE INVENTION

The invention relates to a clustering technique for cyclic phenomena. For instance, the invention can be used to process data arrays that collectively describe cyclic behavior of one or more variables in several entities in a physical process.

Clustering techniques, such as k-means algorithms, hierarchical clustering techniques, self-organizing maps, or the like, are widely used to analyze the variable behavior in physical processes. In order to provide a concrete but non-limiting example, the physical process can be the operation of cellular a telecommunication network, each of the several entities may be a cell or some other resource of that network and the one or more variables may be performance indicators, such as amount of traffic, usage of resources, number (or percentage) of dropped connections, or the like.

Prior clustering techniques suffer from the drawback that large amounts of useful information is ignored.

BRIEF DESCRIPTION OF THE INVENTION

An object of the present invention is to provide a method and an apparatus for implementing the method so as to alleviate the above disadvantage. The object of the invention is achieved by the methods and equipment which are characterized by what is stated in the independent claims. The preferred embodiments of the invention are disclosed in the dependent claims.

The invention is based on the discovery that prior clustering techniques treat the variables as absolute quantities. In the context of telecommunication networks this is understandable because, for example, the networks are constrained by physical resources, such as the number of traffic channels, which must not be exceeded. Accordingly, it is natural to consider a situation anomalous if the physical resources are to be exceeded. But it is precisely this observation of the variables as absolute values that wastes large amounts of useful information. Thus the invention is partially based on the idea that the cyclic behavior of a small entity can be similar to that of a large entity if the absolute values are suppressed. This can be achieved by a method for processing data arrays that collectively describe cyclic behavior of at least one variable in several entities in a physical process. The method comprises the following steps:
1. determining a first cycle in the cyclic behavior and dividing the first cycle into multiple time slots;
2. determining multiple data arrays, each data array containing multiple data items such that each data item describes a variable of an entity in one time slot;
3. for each of the several entities, determining a specific magnitude parameter;
4. scaling the data arrays between entities such that the specific magnitude parameters are suppressed;
5. training a clustering system with a first plurality of the scaled data arrays to determine a set of cluster centers; and
6. using the trained clustering system to cluster a second plurality of the scaled data arrays.

In order to make the above steps more understandable, we will continue to use the cellular telecommunication network as an example. The reader is reminded, however, that this is only a non-limiting example and only serves to clarify how the various elements of the invention may relate to each other.

In step 1, if the physical process is a telecommunication network, the first cycle is typically a 24-hour period and the time slots are typically hours. The 24-hour period is determined by the life rhythm of network users but the one-hour time slot is merely a convenient choice because humans are used to measure time in hours. But for a computer, time slots of any size are equally feasible, and the time slots do not even have to be equal in length. For example, during quiet periods (typically nights), the time slots can be longer than during periods of high activity. The term 'first cycle' implies that there may be further cycles, such as a week cycle that has seven time slots of one day each.

The term 'cyclic' should be understood in a broad sense as is usual in the context of statistical real-world phenomena. The fact that a performance indicator is cyclic does not mean that the performance is identical between any two cycles. Rather the term means that as a whole, there is a cyclically repeating pattern: given any two large sample periods of multiple cycles each, the performance over those periods tends to be similar. Differences occur, however, and the purpose of many clustering systems is to determine whether the differences represent system failures, fraudulent user behavior or other anomalies.

In step 2, each data item describes a variable of an entity in one time slot. For example each data item may describe a performance indicator of a cell in a cellular telecommunication network during a specific time slot. Typically, the performance indicator is summed or averaged over the time slot. The data arrays are collections of the data items over the cycle. For example, if the time slot is a one-hour period, the data array may be a set (such as an array) of 24 sample values that collectively cover a 24-hour period. If the data array is visualized as curve, it has a definite form and magnitude (size).

In step 3, a specific magnitude parameter is determined for each entity. In step 4, the data arrays are scaled between entities such that the specific magnitude parameters are suppressed. The magnitude parameter is any mathematical quantity that can be used to suppress the absolute quantities such that only the form remains. The scaling operation makes large and small entities compatible with each other. In other words, information obtained by clustering data from an entity can be used to cluster data from another entity, regardless of its size. (In this context, 'size' means the magnitude of its performance indicator, such as the amount of traffic, and not its geographical dimensions.)

In step 5, a clustering system is trained with a first plurality of the scaled data arrays to determine a set of cluster centers. The training step can be entirely conventional, apart from the fact that the data arrays are scaled as described in connection with steps 3 and 4. The clustering system being conventional means that the invention does not require any specific clustering system or is not tied to any particular system, although some preferred clustering techniques will be described later.

In step 6, the clustering system trained in step 5 is used to cluster a second plurality of the scaled data arrays. Again, as seen from purely a mathematical point of view, the step of using the trained clustering system can be entirely conventional, but inventive idea of using scaled data arrays to suppress the magnitude between entities opens the way to novel applications, as will be described later.

An advantage of the invention is that more useful information is obtained from a physical process because variables, such as performance indicators, are not restricted to entities of a given size. By performing the scaling operation prior to clustering, the inventive technique is compatible with conventional clustering techniques.

The invention can be used in several applications. For example, the data arrays clustered and scaled by means of the inventive method can be used to detect anomalous situations. In another application the scaled data arrays are used to determine a pricing strategy. In yet another application the scaled data arrays are used to determine optimized operating parameters for a network resource, which parameters are then copied to another network resource. Yet further, the inventive technique can be used to detect subscribers whose profiles closely match certain template customers but whose usage of services differs from that of the template customers. This information can be used to target advertising of services to the detected customers.

According to a preferred embodiment of the invention, the data arrays clustered by using a first cycle are re-clustered by using a second cycle that is a multiple of the first cycle. For instance, the data arrays with the first cycle may represent the daily behavior of a network element or resource, while the data arrays re-clustered with the second cycle represent the development of the daily behavior in the course of years.

According to another preferred embodiment of the invention, the clustering system is an unsupervised clustering system. A benefit of using an unsupervised clustering system is that clustering centers can be found without prior knowledge of them. However, if there is a priori information concerning the cluster centers, commonly called 'seed values', it is beneficial to initialize the unsupervised clustering system with such seed values.

Information obtained by the inventive process can be used in novel ways. Before describing these application areas in detail, let us introduce some terms which will keep the following description more compact. The clustering system will process the data arrays and produces a set of cluster centers. It is convenient to use a term 'prototype' for the data arrays that describe the cluster centers. A collection of the prototypes with their respective indicators can be called a codebook. Use of the codebook provides several benefits. For instance, instead of archiving an entity's behavior during a certain time slot as a complete data slot (such as 24 individual samples per day), we can select the best-matching prototype from the codebook and merely store an indicator of the best-matching prototype, which obviously saves large amounts of memory space. Thus the invention is useful in archiving data.

A data array is rarely if ever precisely identical with a prototype in the codebook. This is why it is beneficial to define a confidence interval such that large deviations from the best-matching prototype can be detected. In case a data array deviates from the best-matching prototype so much that it is outside the confidence interval, it is beneficial to archive the entire data array and not only the prototype indicator. An even better alternative is to archive an indicator of the best-matching prototype and the time slots in which the performance indicator is outside the confidence interval, and the actual (or scaled) data values in those time slots. Preferred techniques for determining the confidence interval will be discussed later.

In addition to providing advantages in data archival, the codebook concept is also useful in data analysis. For example, it is far from trivial to determine whether any two entities behave in a similar or almost-similar manner, particularly if the magnitudes of the performance indicators between the entities differ. But it is a relatively straightforward task to detect similar behavior between entities if the detection of similarities is based on an analysis of prototype indicators in the codebook.

In some embodiments, the invention can be used to recover missing values from the history of an observable variable, such as a quantity in a network resource. If we only know a daily, weekly or monthly average of that variable in the past, a reasonable estimate of that variable's hourly behavior can be obtained by extrapolating the present hourly behavior. The present hourly behavior can be determined from the same entity or its closest-matching prototype.

The invention can be implemented as a programmed data processing system, as is well known in the context of clustering system. The primary deviation from the prior art, namely the suppressing of the specific magnitude parameters of the observed entities or variables, can be implemented by calculation routines. Similarly, the confidence interval used in some embodiments can be determined by calculation routines. An embodiment in which, if the confidence-interval criterion is met, only a best-matching prototype indicator is archived and the full data is discarded or moved to secondary storage, can be implemented as a suitably configured data base system.

BRIEF DESCRIPTION OF THE DRAWINGS

In the following the invention will be described in greater detail by means of preferred embodiments with reference to the attached drawings, in which

FIGS. 4A and 4B show two exemplary profile descriptors;

DETAILED DESCRIPTION OF THE INVENTION

Figure 1:
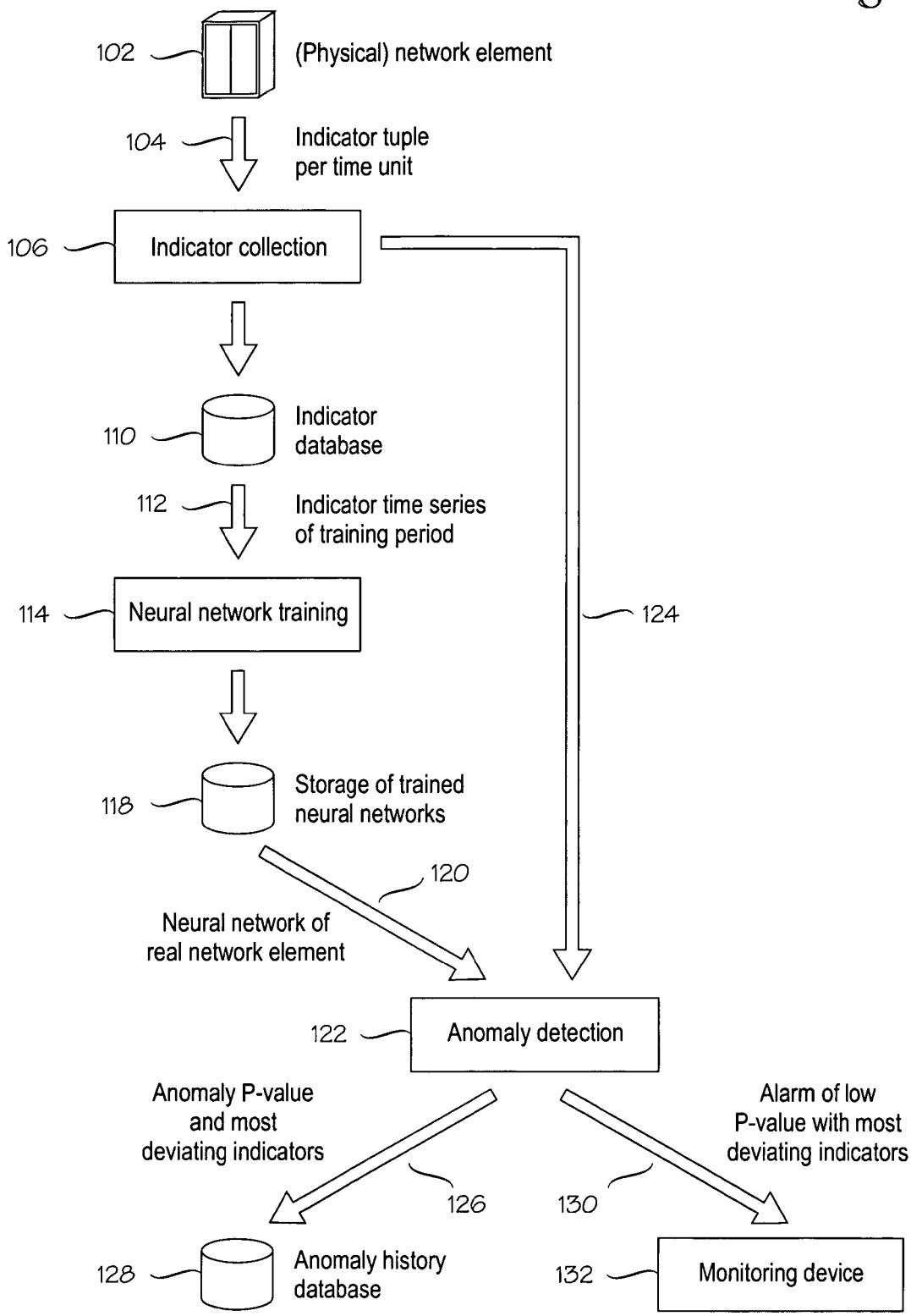
FIG. 1 is a block diagram illustrating the use of a clustering system for anomaly detection.

The invention can be used in several applications. An illustrative example is processing anomalous situations. FIG. 1 is a block diagram illustrating the use of a clustering system, such as a neural network, for anomaly detection. Reference number 102 points to an element of a physical system such as a telecommunication network (as distinguished from a neural network). A physical element may comprise several observable variables. For example, if the physical system element 102 is a telecommunication exchange, its observable variables may comprise throughput, waiting time, number (or percentage) of failed calls and the like. For each unit of time, an indicator collector 106 collects an indicator tuple 104. The tuples are stored in an indicator database 110. Reference 112 points to a data set used for training the neural network (or another learning mechanism) 114. The data set 112 should indicate normal behavior of the physical element 102. A storage 118 contains trained neural networks. When a physical element 102 is to be observed, the corresponding trained neural network 120 is retrieved from the storage 118 and applied as one input to the anomaly detection mechanism 122. The anomaly detection mechanism's other input is the indicator set 124 to be tested for anomalous behavior. If the anomaly detection mechanism 122 decides that the behavior described by the indicator set 124 is anomalous, the anomaly P-value and the most deviating indicators 126 are stored in an anomaly history database 128. At the same time, an alarm 130 is given to a monitoring device 132, such as a computer screen.

Figure 2:
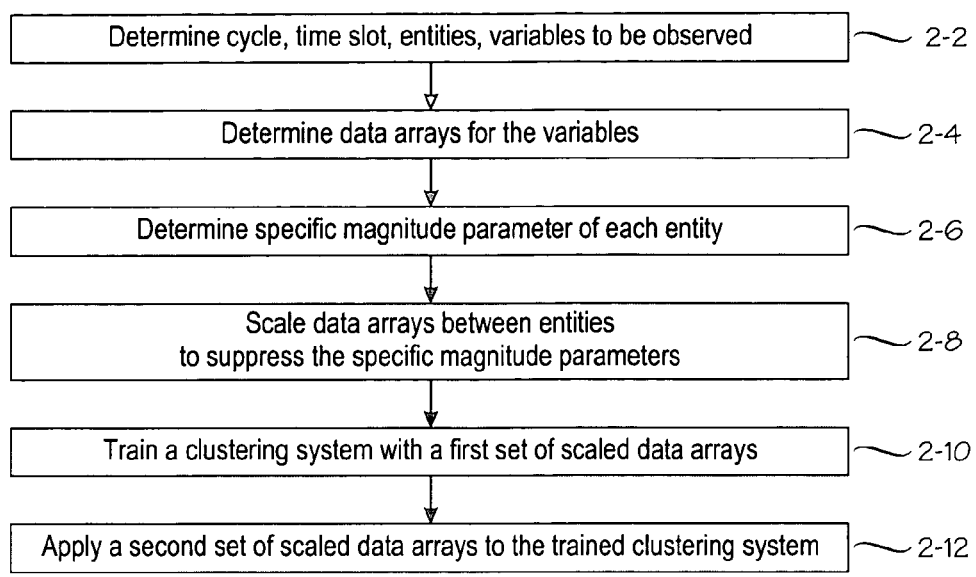
FIG. 2 is a flow chart illustrating the principle of the invention.

FIG. 2 is a flow chart illustrating the principle of the invention. Step 2-2 is a preparation step for determining the cycle (or multiple nested cycles), the time slots (such as hours, days, weeks . . . ), the entities (such as physical network resources) and variables to be observed (such as throughput, number of dropped calls, number of handovers, number of short messages, or the like). Step 2-4 is another preparatory step for determining data arrays for the observable variables. For instance, assuming that one of the observable variables is number of handovers in a cell and that each time slot is one hour and the cycle is a 24-hour period, it is convenient to describe each data array as a vector of 24 data items (numbers), each data item describing the number of handovers during a respective hour.

Step 2-6 comprises determining a specific magnitude parameter for each entity. A preferred type of specific magnitude parameter is the sum or average value over a cycle. Assuming that the average value is used as the specific magnitude parameter, the data arrays (vectors) of each entity will be divided by the average value of that entity, so that over the cycle, the average values of the data items describing each entity will be equal. In other words, the specific magnitude parameters of the entities will be suppressed. This takes place in step 2-8. Next, in step 2-10, a clustering system is trained with a first set (a training set) of scaled data arrays. This step completes the preparation and training phase of the clustering system. Actual use of the clustering system takes place in step 2-12, which can be conventional apart from the fact that the data arrays are scaled by suppressing the specific magnitude parameters of the entities.

An exemplary benefit of using the average value as the specific magnitude parameter is that the anomaly detection system shown in FIG. 1 and trained with observation data from an arbitrary entity can be used to detect anomalies in other entities with considerably larger or smaller capacities.

Figure 3:
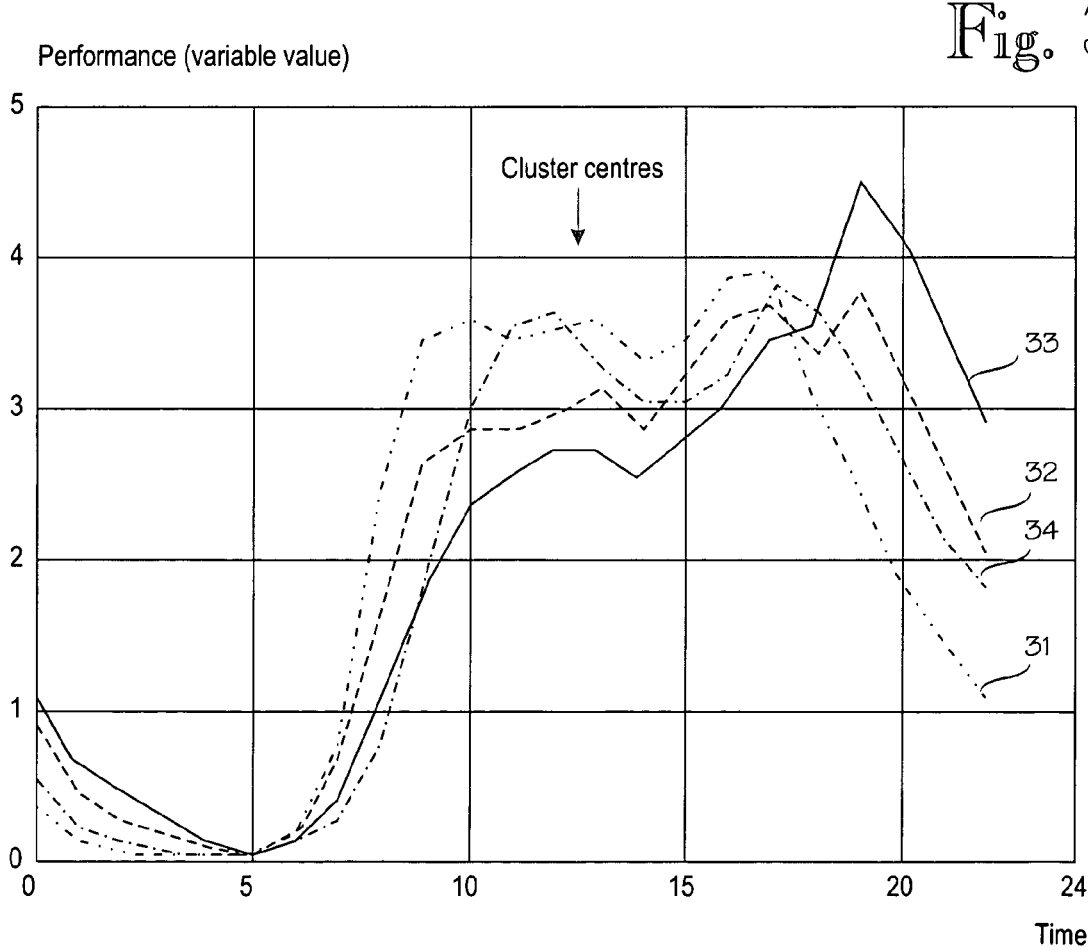
FIG. 3 shows four cluster centers that are scaled to suppress the magnitude parameters of entities of different size.

FIG. 3 shows four cluster centers that are scaled to suppress the magnitude parameters of entities of different size. In this example, the cluster centers are graphical representations of 24-element vectors, wherein each vector represents daily behavior of a physical resource, such as amount of traffic in a network cell. It is apparent from FIG. 3 that the invention extracts the shape of an entity's behavior from its magnitude. The average value of each vector is the same. This also means that the areas covered by the graphical representations of the vectors are equal. In other words, since the cycle length for each vector is the same, using a vector's area or integral as the magnitude parameter is mathematically equivalent to using its average value.

FIG. 4 shows an exemplary profile 40 for an entity, such as a physical resource. Assume again that the physical resource is a network cell and the observable variable is the amount of traffic. The leftmost column indicates weekdays such that Monday is '1' and Sunday is '7'. The cluster numbers 1 through 4 refer to the four cluster centers shown in FIG. 3. In this example, the profile 40 indicates that for the cell in question, cluster 4 is the best behavior indicator for Mondays through Thursdays and Sundays. The probability for other clusters being best behavior indicators is negligible, which means that the probability may not be precisely zero but it can be ignored for practical purposes. Likewise, all Saturdays are best represented by cluster 3, as indicated by the last line of the profile 40. However, all Fridays are not alike, and 83 percent of them are best represented by cluster 1, while the remaining 17 percent of them are best represented by cluster 4.

FIG. 4B shows a more detailed weekly profile 45. The dashes in the probability column indicate values that are small enough to be ignored. This example shows that for practical purposes all Mondays (day number 1) are best represented by cluster 4, whereas cluster 4 has only a 30% probability of being the best descriptor for Fridays, cluster 1 having a probability of 70 percent, and so on.

Figure 5:
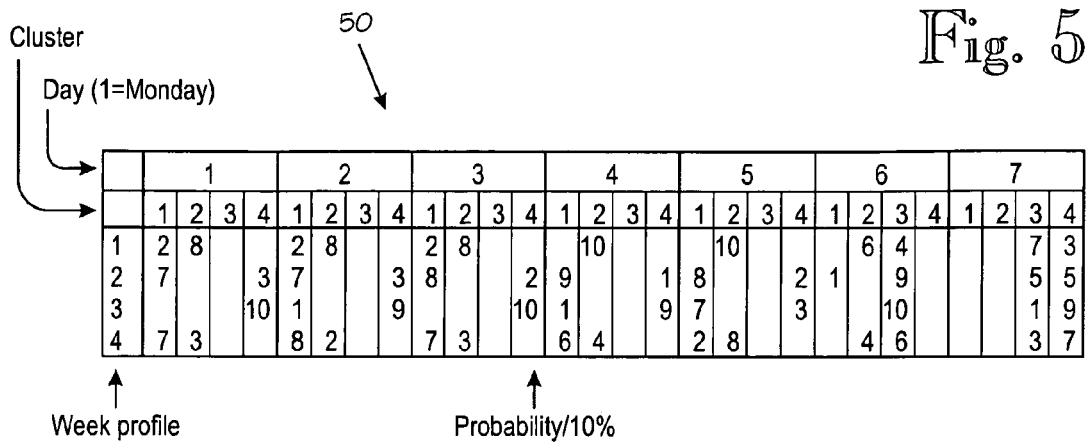
FIG. 5 shows a probability distribution for four different weekly clusters.

FIG. 5 shows a probability distribution 50 for four found weekly clusters. In this example, we have four alternative week profiles and four cluster centers (such as the ones whose graphical representations are shown in FIG. 3). To keep the probability distribution table 50 compact, the table indicates the probability in units of 10 percent each. Thus an entry of 4, for example, means 40 percent. The probability distribution 50 indicates that in week profile 1, clusters 1 and 2 have a probability of 20 or 80 percent, respectively, for being the best representation of Mondays. In this profile, the probabilities for the remaining clusters 3 and 4 are negligible. In week profile 2, clusters 1 and 4 have a probability of 70 or 30 percent, respectively, for being the best representation of Mondays, and the probabilities for the remaining clusters 2 and 3 are negligible, and so on.

By means of the probability distribution 50, hourly estimations can be computed by multiplying an average variable value over a cycle with the estimated profile shape of that variable.

The weekly profiles 40, 45 and/or the probability distribution 50 can be used in several applications. For example, they can be used reduce memory consumption when archiving observation data. Instead of archiving the observation data as 24 absolute values for each 24-hour cycle, we may scale (divide) the absolute values by the specific magnitude parameter (such as an average value) of that cell and cycle and check whether the entity's behavior, after scaling, corresponds to one of the predetermined profiles. If it does, it suffices to archive the specific magnitude and the profile number for that 24-hour period, which in itself causes a considerable reduction in memory consumption.

Another application for the weekly profiles 40, 45 and/or the probability distribution 50 is improved prediction. By suppressing the magnitude differences between entities and concentrating on the profile shapes, it is possible to use information obtained from entities of arbitrary magnitude, provided that the entities have similar profile shapes.

Yet another application is "predicting the past". This means, for example, that we may only know an average value of a variable at a certain time in the past. By knowing its present profile shape, it is possible to estimate the past behavior of that variable as a function of time.

Figure 6:
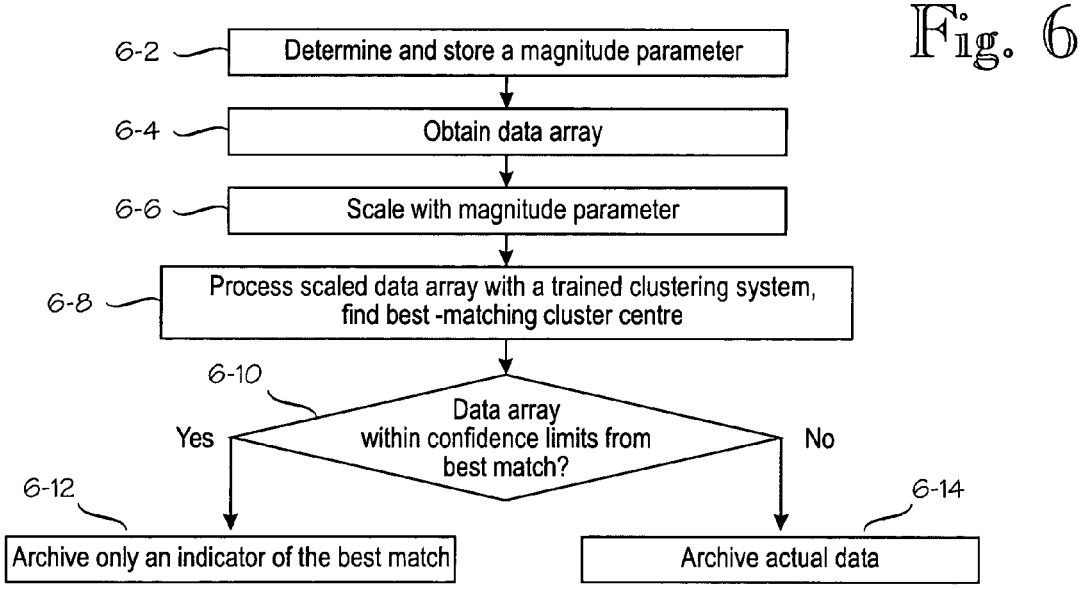
FIG. 6 illustrates a preferred technique of storing observations.
Figure 7:
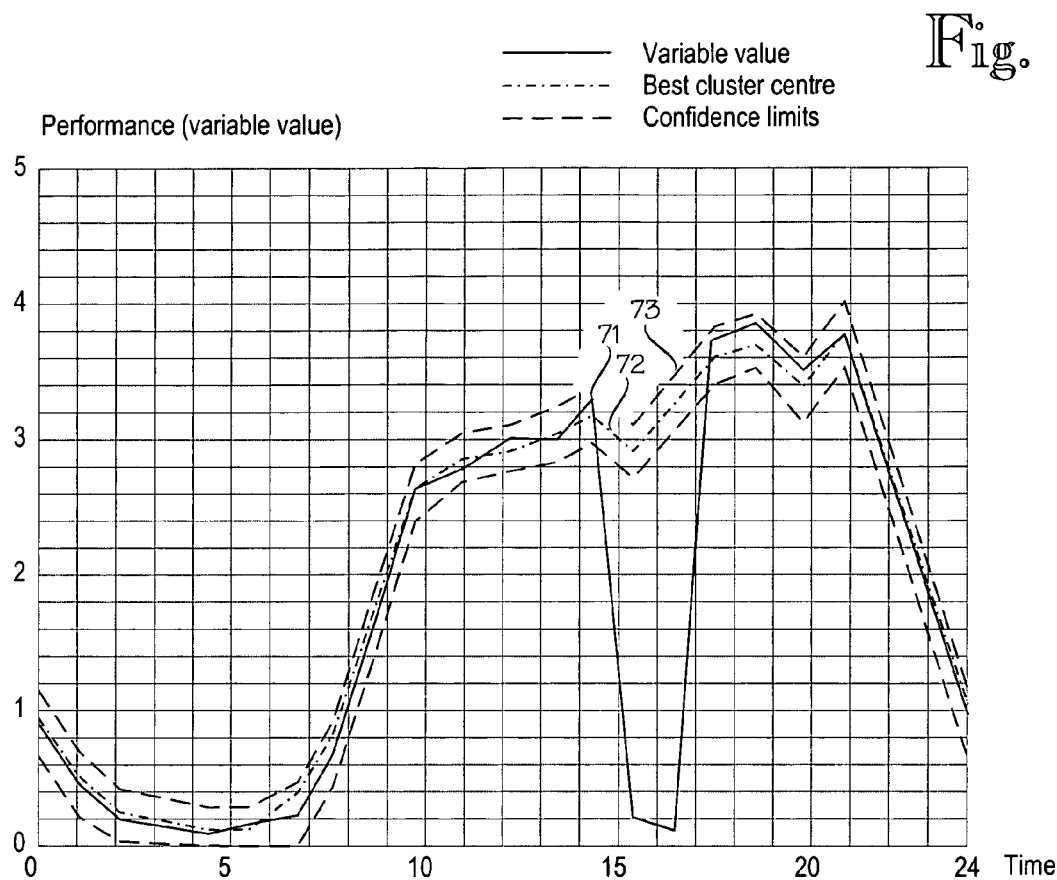
FIG. 7 shows an anomalous situation.

FIGS. 6 and 7 illustrate a preferred technique of archiving observations. As used herein, 'archiving' means a technique in which some relevant data is stored for a time (typically years) and non-relevant data is either discarded or moved to cheaper, typically off-line, storage. In other words, archiving comprises deciding what to store and what to discard, in order to reduce memory consumption.

FIG. 6 is a flow chart of an archiving method. Step 6-2 is a preparatory step, in which a specific magnitude parameter for the observed entity is determined and stored. This step is similar to step 2-6 in FIG. 2. Step 6-4 comprises obtaining a data array of observed variables, such as vector of 24 hourly traffic values. In step 6-6, the data array is scaled with the specific magnitude parameter for the observed entity. In step 6-8, the scaled data array is processed with a trained clustering system to find its best-matching cluster center. In step 6-10, it is determined whether the scaled data array is within a predetermined confidence interval from the best-matching cluster center. If it is, step 6-12 is performed, in which only the indicator of the best-matching cluster center is stored (archived), and the actual data array is either discarded or moved to a secondary storage. On the other hand, if the scaled data array is not within the predetermined confidence interval from the best-matching cluster center, then step 6-14 is performed, in which the complete data array is stored (archived), either in a scaled or non-scaled form. Even more efficient use of archival memory is achieved by archiving indications of the best-matching cluster center, the time slots in which the samples deviate from the best-matching cluster center such that they are outside the predetermined confidence interval, and the actual sample values at those time slots.

FIG. 7 shows an anomalous situation. Curve 71 shows the actual scaled observations of a physical entity, such as a network resource. The best-matching prototype (cluster center) is shown by curve 72. The actual observations 71 are within the predetermined confidence interval 73 for most of the 24-hour cycle, except for three observations at 15:00, 16:00 and 17:00.

Figure 8:
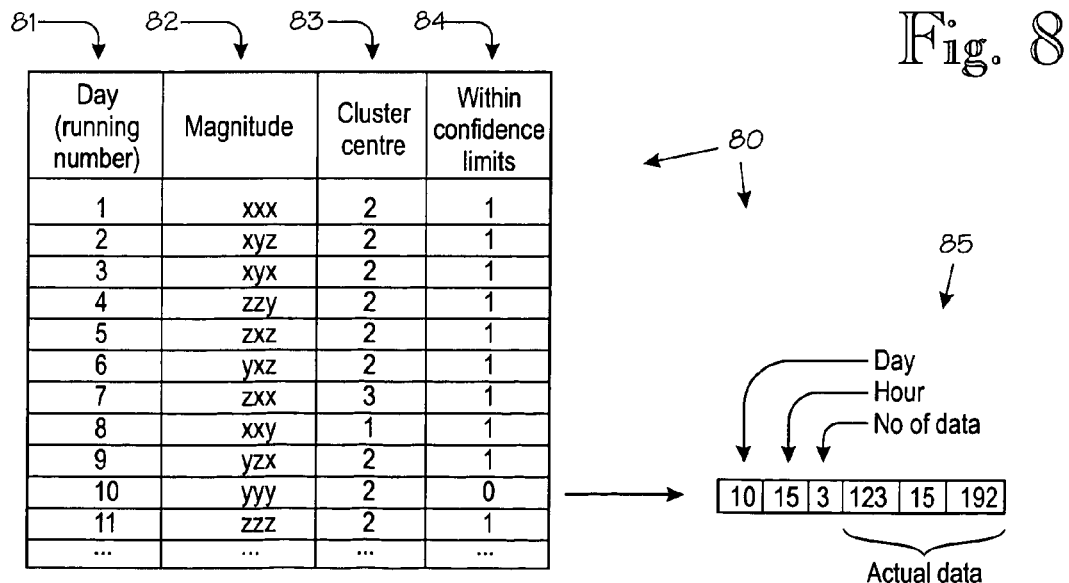
FIG. 8 illustrates a data structure for archiving data, with allowances for anomalous situations.

FIG. 8 illustrates a preferred data structure for storing observations. The data structure 80 comprises an observation history for one entity and one variable. Column 81 is a running number of the cycle, such as a 24-hour period. Data arrays that comprise actual observations are scaled by dividing with the specific magnitude parameter 82. Then the scaled data arrays are clustered with a trained clustering system. The observation history 80 shows entries for 11 consecutive days. An entry for a day (or any other cycle used) comprises the best-matching cluster center 83 and a flag 84 that indicates whether the scaled data array is within predetermined confidence interval, ie, whether it deviates from the best-matching cluster center by less than some confidence measure.

For most days, cluster center 2 was the closest match. For days 7 and 8, cluster centers 3 and 1, respectively, were the best matches. For day 10, however, we assume that the actual observations followed the curve 71 in FIG. 7. In other words, the actual observations were within the confidence interval 83 of the best-matching prototype (cluster center) number 2 (shown as curve 72) except for a three consecutive observations beginning at 15:00. Accordingly, the entry for column 83 and day 10 indicates that cluster center 2 was the best match but the flag in column 84 shows that the scaled observations are not within the confidence interval for the entire cycle. There is an actual observations record 85 for day 10. The actual observations record 85 indicates that on day 10, beginning at 15:00, the actual observations for three consecutive hours were 123, 15 and 192.

If all the scaled observations of a cycle, such as a 24-hour period, are within the confidence interval, only three descriptors have to be archived, namely the magnitude (a float number), the best-matching cluster center (an integer) and the flag 84.

Further Applications

The applications of the invention are not restricted to processing anomalous situations. In one preferred embodiment of the invention, there is created a data structure for customers and the services used by them. The idea is to cluster together customers with almost similar service distributions. This embodiment makes use of the codebook concept. The set of services used by any given customer constitutes a data array (vector). The data arrays are then clustered to find cluster centers, which in this case are prototype customers whose service combinations are very popular. Any given customer's deviation from the closest-matching prototype customer represents a difference in the set of services used by those customers. This information can be used to offer services to customers who do not yet use such services. In a telecommunication network, such services can be offered via the network itself.

The clustering-based technique of offering services saves resources, such as network resources, over a brute-force technique that involves a simple database scan of customers that do not yet use some services. The resource-saving aspect of the clustering technique stems from the fact that if a prototype customer uses services A, B, C and D, which is a popular service combination, and another customer uses services A, B and C, that customer is a more potential target for service D than is a customer who uses services A, X and Y. On the other hand, the brute-force technique wastes network and other resources by offering services "blindly", that is, without any consideration as to whether or not the customer is a close but not identical match to a prototype customer.

In another embodiment of the invention, there is created a data structure for customers and their hourly service-use profiles. This embodiment can be used to optimize the times when the tariffs change. Because the invention makes information from different-sizes equivalent, such tariff-change optimization can utilize information from entities of any size.

Instead of using the invention to optimize the times when the tariffs change, or in addition to such use, the invention can be used to optimize other operating parameters of the observed entity. For example, a network operator can copy a set of parameters from an optimized entity to a non-optimized one, regardless of the size of the entities. This embodiment involves creating an activity shape codebook and clustering the daily behavior of the entities. For example, in a cellular network the parameters to be optimized may comprise frequency re-use patterns, bandwidth allocation between services, or the like.

Yet another embodiment of the invention comprises a data structure for optimizing transmission times for asynchronous services. It is expected that cellular networks will be increasingly used to deliver "infotainment" in the form of multimedia files. A network operator can use the invention to optimize the transmission times for the transmission. The network may employ load balancing by scheduling file delivery to a future time slot with a low expected load. An optimal slot can be identified by means of an estimated load profile. Customer classification by clustering may affect the selection such that certain customers are willing to tolerate longer delays. The network should be able to indicate a delay estimate to the customers.

The invention can also be used to optimize service scheduling. Since information from small- or large-size entities is largely equivalent, after suppressing the specific magnitude, network or service operators have access to larger amounts of information than is possible otherwise. The operators can use this information to schedule service operations optimally. For instance, a network maintenance system may receive a request to retrieve a data log from a network element. The system may check an estimated traffic profile shape and schedule the requested log retrieval (or other maintenance operations) outside of traffic peaks.

Confidence Interval

In the following, preferred techniques for determining confidence interval or confidence limits will be discussed. For instance, a variable value that deviates from its closest-matching prototype (cluster center) by more than a predetermined confidence limit can be called an anomaly or exception.

Confidence limits are normally calculated as $k \cdot \sigma$, wherein $\sigma$ is the standard deviation of the variable and $k$ is a coverage factor that indicates the required confidence level. For normally distributed data, $k=1.96$ means a confidence level of 95 percent. Coverage factors 2 and 3 are often used regardless of the underlying distribution.

According to a preferred embodiment of the invention, the standard deviation σ is calculated separately for each cluster and time slot. Let us use cluster number 1 at 08:00 as an example. The day profiles belonging to cluster 1 are assembled. Then the standard deviation of the values at 08:00 is calculated from these profiles.

Now the idea is to scale the confidence limits so that for a profile originating from an entity with higher average variable values (such as a network cell with more traffic), a stricter confidence limit is obtained. This can be accomplished as follows:

$$k_{var}=k \cdot f(\text{mean(var)}) \quad [1]$$

In equation 1, f is a decreasing function (monotonous or step function) and mean(var) is the mean value of the variable over a cycle, for example an average value of traffic in a cell over a 24-hour cycle. A preferred version of the monotonous decreasing function is an inverse square root of the mean value of each cycle (such as a day) as follows:

$$k_{var} = \frac{k}{\sqrt{\text{mean(var)}}} \quad [2]$$

Thus a different variable-dependent coverage factor is obtained for each cycle. The confidence limit can then be expressed as $$\text{conf\_level}=\mu \pm k_{var} \cdot \sigma \quad [3]$$

Herein μ is the mean value in the cluster in a specific time slot, wherein the cluster is also the cluster center given by k-means clustering, and σ is the standard deviation of the data within the cluster as described above.

Figure 9:
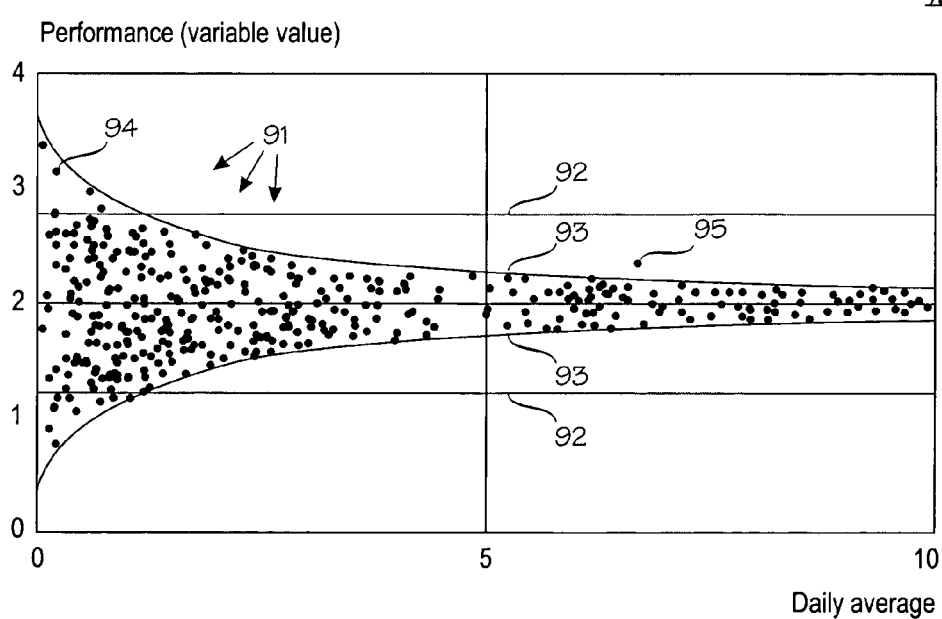
FIG. 9 illustrates preferred techniques for determining a confidence interval.

FIG. 9 illustrates an application of a confidence limit determined by equation 2. The y-axis represents scaled values of a variable (performance indicator) and the x-axis is the daily mean on a scale of 0 to 4, the average value being 2 in this example. Black circles 91 represent observations. Horizontal lines 92 depict fixed confidence limits, such as average plus/minus twice the standard deviation.

Curves 93 schematically (but not precisely) illustrate confidence limits determined by equation 2, in which the confidence interval defined by the confidence limits narrows progressively (asymptotically in this example) with increasing magnitude parameter. For example, observation 94 is within the progressively decreasing confidence interval 93 but not within the fixed confidence interval 92. On the other hand, observation 95 is outside the progressively decreasing confidence interval 93 but is within the fixed confidence interval 92. Assuming that the variable describes amount of traffic in a cell, the progressively decreasing confidence interval 93 means that when the traffic is quiet, larger proportional deviations are tolerated than in more active cells. For example, a quiet cell in a rural area may normally have, say, 10 calls per hour. If someone makes three failed call attempts with a faulty mobile telephone, this is not necessarily an anomaly, whereas 30 failed call attempts out of 100 is a serious anomaly.

It will be apparent to a person skilled in the art that, as the technology advances, the inventive concept can be implemented in various ways. The invention and its embodiments are not limited to the examples described above but may vary within the scope of the claims.

We claim:

1. A computer-implemented method for producing a trained clustering system, the method comprising:
    processing data arrays that collectively describe cyclic behavior of at least one variable in several entities in a telecommunication network;
    wherein said processing of the data arrays comprises
        determining a first cycle in the cyclic behavior and dividing the first cycle into multiple time slots;
        determining multiple data arrays, each data array containing multiple data items such that each data item describes a variable of an entity in one time slot;
        for each of the several entities, determining a specific magnitude parameter; and
        scaling the data arrays between entities such that the specific magnitude parameters are suppressed;
    wherein the method further comprises training a clustering system with a first plurality of the scaled data arrays to determine a set of cluster centers, thereby producing the trained clustering system operable to cluster a second plurality of the scaled data arrays, whereby the second plurality of the scaled data arrays clustered by the trained clustering system may differ in magnitude from the first plurality of the scaled data arrays used for training the clustering system.

2. The method according to claim 1, wherein the specific magnitude parameters are determined separately for each first cycle.

3. The method according to claim 1, further comprising determining a second cycle that is a multiple of the first cycle and re-clustering the clustered data arrays in respect of the second cycle.

4. The method according to claim 1, further comprising processing the suppressed specific magnitude parameter separately from the clustering system.

5. The method according to claim 1, wherein the clustering system is an unsupervised clustering system.

6. The method according to claim 5, further comprising initializing the unsupervised clustering system with a-priori seed values prior to said training.

7. The method according to claim 1, further comprising:
    associating predetermined confidence interval with the cluster centers;
    for each clustered data array of the second plurality, determining a best-matching cluster center and checking if the clustered data array is within said predetermined confidence interval of the best-matching cluster center;
    if the clustered data array is within said predetermined confidence interval of the best-matching cluster center, archiving an indicator of the best-matching cluster center and discarding the data array in question; or
    if the clustered data array is within said predetermined confidence interval of the best-matching cluster center, archiving data items of the data array for those time slots in which the clustered data array is not said within said predetermined confidence interval.

8. The method according to claim 7, wherein the confidence interval narrows progressively with increasing magnitude parameter of the variable described.

9. The method according to claim 1, further comprising using the clustered second plurality of the scaled data arrays to detect anomalous situations.

10. The method according to claim 1, further comprising using the clustered second plurality of the scaled data arrays to determine a pricing strategy.

11. The method according to claim 1, wherein the scaled data arrays represent usage of services by various subscribers, and the method further comprises using the clustered second plurality of the scaled data arrays to select candidate subscribers for service advertising.

12. The method according to claim 1, wherein said several entities are network resources and the method further comprises:
    using the scaled data arrays to determine a set of optimized operating parameters for a network resource; and copying the optimized operating parameters to another network resource.

13. A computer program product embodied on a computer readable medium, the computer program product comprising program code for controlling a processor to execute a method, the method comprising:
  receiving multiple data arrays, each data array containing multiple data items such that each data item describes a variable of an entity in one time slot;
  determining a specific magnitude parameter for each of the several entities;
  scaling the data arrays between entities such that the specific magnitude parameters are suppressed;
  training a clustering system with a first plurality of the scaled data arrays, to determine a set of cluster centers; and
  clustering a second plurality of the scaled data arrays with the trained clustering systems,
  wherein the method further comprises processing data arrays that collectively describe cyclic behavior of at least one variable in several entities in a telecommunication network to obtain the second plurality of the scaled data arrays, and using the second plurality of the scaled data arrays to determine at least one condition, wherein the cyclic behavior exhibits at least a repeating first cycle and each first cycle comprises multiple time slots.

14. The computer program product according to claim 13, wherein a magnitude-determination routine is operable to determine the specific magnitude parameters separately for each first cycle.

15. The computer program product according to claim 13, further comprising processing the suppressed specific magnitude parameter separately from the clustering system.

16. The computer program product according to claim 13, further comprising an archival routine operable:
  to associate a predetermined confidence interval with the cluster centers;
  for each clustered data array of the second plurality, to determine a best-matching cluster center and to check if the clustered data array is within said predetermined confidence interval of the best-matching cluster center;
  if the clustered data array is within said predetermined confidence interval of the best-matching cluster center, to archive an indicator of the best-matching cluster center and to discard the data array in question; or
  if the clustered data array is within said predetermined confidence interval of the best-matching cluster center, to archive data items of the data array for those time slots in which the clustered data array is not said within said predetermined confidence interval.

17. An apparatus comprising:
  a determining unit configured to determine a first cycle in the cyclic behavior and dividing the first cycle into multiple time slots;
  a unit configured to determine multiple data arrays, each data array containing multiple data items such that each data item describes a variable of an entity in one time slot;
  for each of the several entities, a unit configured to determine a specific magnitude parameter;
  a scaling unit configured to scale the data arrays between entities such that the specific magnitude parameters are suppressed;
  a training unit configured to train a clustering system with a first plurality of the scaled data arrays to determine a set of cluster centers; and
  a unit configured to use the trained clustering system to cluster a second plurality of the scaled data arrays,
  wherein the apparatus is used for processing data arrays that collectively describe cyclic behavior of at least one variable in several entities in a telecommunication network to obtain the second plurality of the scaled data arrays, and using the second plurality of the scaled data arrays to determine at least one condition.

18. An apparatus comprising:
  determining means for determining a first cycle in the cyclic behavior and dividing the first cycle into multiple time slots;
  determining means for determining multiple data arrays, each data array containing multiple data items such that each data item describes a variable of an entity in one time slot;
  for each of the several entities, determining means for determining a specific magnitude parameter;
  scaling means for scaling the data arrays between entities such that the specific magnitude parameters are suppressed;
  training means for training a clustering system with a first plurality of the scaled data arrays to determine a set of cluster centers; and
  means for using the trained clustering system to cluster a second plurality of the scaled data arrays,
  wherein the apparatus is used for processing data arrays that collectively describe cyclic behavior of at least one variable in several entities in a telecommunication network to obtain the second plurality of the scaled data arrays, and using the second plurality of the scaled data arrays to determine at least one condition.

19. The method of claim 1, wherein at least some of the entities in the telecommunication network are resources of the telecommunication network.

20. The method of claim 19, further comprising using the scaled data arrays to determine a set of optimized operating parameters for a first resource of a telecommunication network and copying the optimized operating parameters to one or more second resources, wherein the first and second resources have different magnitude parameters.

21. The method of claim 1, wherein the at least one variable includes a performance indicator which indicates a performance of the telecommunication network.

22. The method of claim 1, further comprising detecting an anomalous situation in the telecommunication network by the trained clustering system.

23. The method of claim 1, further comprising determining a pricing strategy in the telecommunication network by the trained clustering system.

24. The method of claim 1, further comprising selecting candidate subscribers for service advertising in the telecommunication network by the trained clustering system.

25. The method of claim 1, further comprising storing the second plurality of the scaled data arrays into a computer storage.

* * * * *